United States Patent
Kyosuna et al.

(10) Patent No.: US 11,536,989 B2
(45) Date of Patent: Dec. 27, 2022

(54) COMMUNICATION DEVICE, PHASE MODULATION SPATIAL LIGHT MODULATING ELEMENT, AND OPERATION CONTROL METHOD

(71) Applicant: NEC CORPORATION, Tokyo (JP)

(72) Inventors: Satoshi Kyosuna, Tokyo (JP); Yoichiro Mizuno, Tokyo (JP); Koya Takata, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 406 days.

(21) Appl. No.: 16/635,399

(22) PCT Filed: Jul. 31, 2017

(86) PCT No.: PCT/JP2017/027788
§ 371 (c)(1),
(2) Date: Jan. 30, 2020

(87) PCT Pub. No.: WO2019/026167
PCT Pub. Date: Feb. 7, 2019

(65) Prior Publication Data
US 2020/0159047 A1    May 21, 2020

(51) Int. Cl.
*H04B 10/54*     (2013.01)
*G02F 1/01*      (2006.01)
*H04B 10/548*    (2013.01)

(52) U.S. Cl.
CPC ......... *G02F 1/0121* (2013.01); *H04B 10/548* (2013.01); *G02F 2203/50* (2013.01)

(58) Field of Classification Search
CPC .... H04B 10/116; H04B 10/548; H04B 10/11; G02F 1/0121
See application file for complete search history.

(56) References Cited

U.S. PATENT DOCUMENTS

| 2013/0222403 A1* | 8/2013 | Clatanoff ............ G06T 1/60 345/544 |
| 2015/0362713 A1* | 12/2015 | Betzig ............. G02B 21/0064 250/459.1 |

(Continued)

FOREIGN PATENT DOCUMENTS

| JP | 9-51309 A | 2/1997 |
| JP | 2006-279888 A | 10/2006 |

(Continued)

OTHER PUBLICATIONS

Int. Search Report dated Oct. 24, 2017 issued by the Int. Searching Authority in corresponding App. No. PCT/JP2017/027788 (PCT/ISA/210).

(Continued)

*Primary Examiner* — Dzung D Tran
(74) *Attorney, Agent, or Firm* — Sughrue Mion, PLLC (57) ABSTRACT

This communication device has a phase-modulation spatial light modulator; and a control unit which causes, during one frame time interval, the phase-modulation spatial light modulator to operate with first and second operation patterns. In a predetermined period within the one frame time interval, the first operation pattern includes a first light transmittable interval during which first signal light can be output, and a first pause interval during which the first signal light cannot be output whereas the second operation pattern includes a second light transmittable interval during which second signal light can be output, and a second pause interval during which the second signal light cannot be output. The first and second light transmittable intervals are each longer than a half of the predetermined period. The second pause interval is present within the first light transmittable interval, and the first pause interval is present within the second light transmittable interval.

9 Claims, 7 Drawing Sheets

(56) References Cited

U.S. PATENT DOCUMENTS

| | | | | |
|---|---|---|---|---|
| 2016/0180779 A1* | 6/2016 | Suzuki | ............... | G09G 3/342 |
| | | | | 345/694 |
| 2017/0293259 A1* | 10/2017 | Ochiai | ............... | G02B 3/0006 |
| 2018/0373009 A1* | 12/2018 | Yuste | ............... | G02B 26/101 |

FOREIGN PATENT DOCUMENTS

| JP | 2011-61267 A | 3/2011 |
|---|---|---|
| JP | WO2015/059852 A1 | 4/2015 |

OTHER PUBLICATIONS

Int. Written Opinion dated Oct. 24, 2017 issued by the Int. Searching Authority in corresponding App. No. PCT/JP2017/027788 (PCT/ISA/237).

* cited by examiner

COMMUNICATION DEVICE, PHASE MODULATION SPATIAL LIGHT MODULATING ELEMENT, AND OPERATION CONTROL METHOD

CROSS REFERENCE TO RELATED APPLICATIONS

This application is a National Stage of International Application No. PCT/JP2017/027788 filed Jul. 31, 2017 and the disclosures of which are incorporated herein in their entirety by reference.

TECHNICAL FIELD

This invention relates to a communication device, a phase-modulation spatial light modulating element, an operation control method, and an operation control program.

BACKGROUND ART

Wireless communication systems using light are known. As such a wireless communication system, Patent Literature 1 describes one example of vehicle-to-vehicle communication that is carried out by wireless communication using light. Patent Literature 1 discloses a vehicle-to-vehicle communication system which is capable of reliably transmitting information of a particular vehicle to another vehicle by means of the wireless communication using light. The vehicle-to-vehicle communication system of Patent Literature 1 comprises a forward projection/reception unit for transmitting/receiving a laser optical signal to/from a forward vehicle, a backward projection/reception unit for transmitting/receiving a laser optical signal to/from a backward vehicle, and signal relay means for carrying out relay of signals between the forward projection/reception unit and the backward projection/reception unit.

CITATION LIST

Patent Literature

PTL 1: JP H09-51309 A

SUMMARY OF THE INVENTION

Technical Problem

In mobile communication using light, in a case where communication having high directivity is carried out by using a laser or the like in order to avoid interference with other transmission/reception units, it is necessary to match alignment (an optical axis) between the transmission/reception units. However, it is generally necessary to use a mechanical gimbal or the like in order to match the alignment. As a result, there is a problem that a device may be increased in size and cost.

In order to resolve this problem, it is conceivable that the transmission/reception unit is provided with a phase-modulation spatial light modulating element which electrically carries out directional control of light. However, the phase-modulation spatial light modulating element has a blanking time interval. As a result, there is a problem that an uncommunicable time interval occurs in a communication apparatus using the phase-modulation spatial light modulating element.

It is an object of this invention to provide a communication device, a phase-modulation spatial light modulating element, an operation control method, and an operation control program which are capable of resolving the above-mentioned problems.

Solution to Problem

A communication device according to a first aspect of the present invention at least comprises a phase-modulation spatial light modulator and a control unit configured to control an operation of the phase-modulation spatial light modulator. The control unit is configured to cause, during one frame time interval, the phase-modulation spatial light modulator to operate with a first operation pattern and a second operation pattern. The first operation pattern includes, in a predetermined period within the one frame time interval, a first light transmittable interval during which first signal light can be produced, and a first pause interval during which the first signal light cannot be produced. The second operation pattern includes, in the predetermined period, a second light transmittable interval during which second signal light can be produced, and a second pause interval during which the second signal light cannot be produced. Each of the first light transmittable interval and the second light transmittable interval is longer than a half of the predetermined period. The second pause interval is present within the first light transmittable interval whereas the first pause interval is present within the second light transmittable interval.

A phase-modulation spatial light modulating element according to a second aspect of the present invention comprises a first area configured to operate with a first operation pattern during one frame time interval and a second area configured to operate with a second operation pattern during one frame time interval. The first operation pattern includes, in a predetermined period within the one frame time interval, a first light transmittable interval during which first signal light can be produced, and a first pause interval during which the first signal light cannot be produced. The second operation pattern includes, in the predetermined period, a second light transmittable interval during which second signal light can be produced, and a second pause interval during which the second signal light cannot be produced. Each of the first light transmittable interval and the second light transmittable interval is longer than a half of the predetermined period. The second pause interval is present within the first light transmittable interval whereas the first pause interval is present within the second light transmittable interval.

An operation control method according to a third aspect of the present invention is a method of controlling an operation of a phase-modulation spatial light modulator, and comprises causing, during one frame time interval, the phase-modulation spatial light modulator to operate with a first operation pattern and a second operation pattern. The first operation pattern includes, in a predetermined period within the one frame time interval, a first light transmittable interval during which first signal light can be produced, and a first pause interval during which the first signal light cannot be produced. The second operation pattern includes, in the predetermined period, a second light transmittable interval during which second signal light can be produced, and a second pause interval during which the second signal light cannot be produced. Each of the first light transmittable interval and the second light transmittable interval is longer than a half of the predetermined period. The second pause interval is present within the first light transmittable interval whereas the first pause interval is present within the second light transmittable interval.

An operation control program according to a fourth aspect of the present invention is for making a computer control an operation of a phase-modulation spatial light modulator, and makes the computer execute, during one frame time interval, processing for causing the phase-modulation spatial light modulator to operate with a first operation pattern and a second operation pattern. The first operation pattern includes, in a predetermined period within the one frame time interval, a first light transmittable interval during which first signal light can be produced, and a first pause interval during which the first signal light cannot be produced. The second operation pattern includes, in the predetermined period, a second light transmittable interval during which second signal light can be produced, and a second pause interval during which the second signal light cannot be produced. Each of the first light transmittable interval and the second light transmittable interval is longer than a half of the predetermined period. The second pause interval is present within the first light transmittable interval whereas the first pause interval is present within the second light transmittable interval.

Advantageous Effects of Invention

According to this invention, it is possible to provide a communication device, a phase-modulation spatial light modulating element, an operation control method, and an operation control program, which are capable of reducing a time interval during which the phase-modulation spatial light modulating element cannot transmit light.

DESCRIPTION OF EMBODIMENTS

Related Art

Figure 1A:
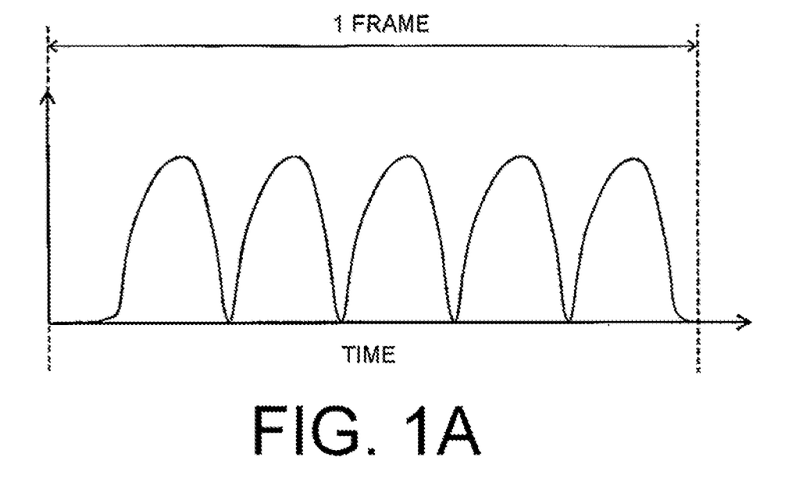
FIGS. 1A and 1B are views for illustrating an operation pattern of a phase-modulation spatial light modulating element according to a related art of the present invention.
Figure 1B:
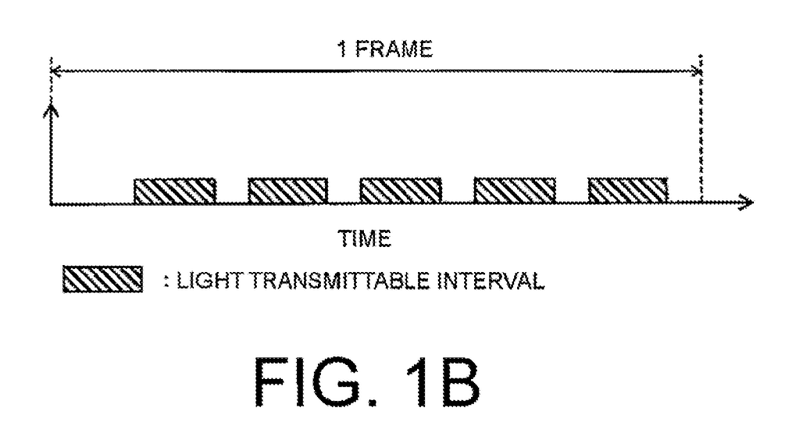

First, in order to facilitate an understanding of the present invention, a problem about a related art will be described with reference B. FIGS. 1A and 1B. FIG. 1A is a schematic view for illustrating a relation between a time and a response of a liquid crystal element while FIG. 1B is a schematic view for illustrating a time interval during which signal light can be transmitted. In FIG. 1B, each interval depicted by hatched lines is an interval during which the liquid crystal element can transmit the signal light (hereinafter called a "light transmittable interval").

For example, it is assumed that one frame time interval includes five light transmittable intervals, as illustrated in FIG. 1A and FIG. 1B. In this event, in the related art, a pause interval during which the signal light cannot be transmitted occurs at a timing when a response of the liquid crystal element falls. Therefore, in the related art, a control signal produced by a control unit is temporarily buffered so that a timing at which the control signal from the control unit is supplied to the liquid crystal element and the pause interval are not overlapped. In this manner, processing for matching the timing at which the control signal is supplied to the liquid crystal element with the light transmittable interval is carried out. Since a signal cannot be produced during the pause interval of the liquid crystal element, a signal transmission amount per time is decreased.

Now, with reference to the drawings, example embodiments of the present invention will be described in detail. In the respective drawings, the same or corresponding parts are depicted by the same reference signs and the description thereof is omitted as appropriate. Each one-way arrow which may be illustrated in the respective drawings represents one example of a flow of a signal (data) but does not limit a direction of the flow of the signal (data).

Figure 2:
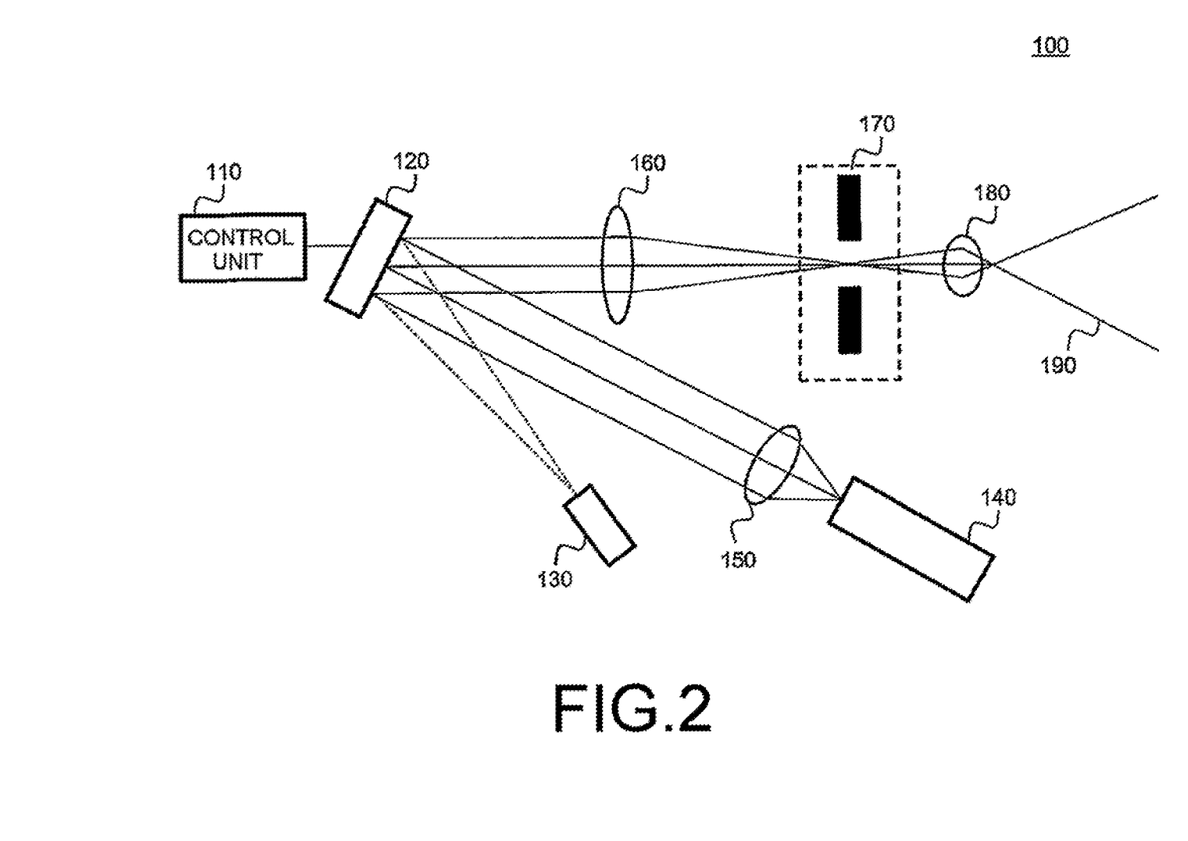
FIG. 2 is a block diagram for illustrating a configuration of a communication device according to each example embodiment of the present invention.

FIG. 2 is a block diagram for illustrating a configuration of a communication device according to each example embodiment of the present invention. As shown in FIG. 2, the communication device 100X comprises a control unit 110, a phase-modulation spatial light modulator 120, a detector 130, a laser light source 140, a collimator lens 150, a Fourier transform lens 160, an aperture 170, and a projection lens 180.

The control unit 110 has a function of controlling an operation of the phase-modulation spatial light modulator 120. When the communication device 100 receives signal light, the phase-modulation spatial light modulator 120 diffracts the signal light received from the outside and collects it at the detector 130.

When the communication device 100 transmits signal light, the laser light source 140 emits laser light toward the phase-modulation spatial light modulator 120. The laser light source 140 may comprise, for example, a laser diode.

The collimator lens 150 converts the laser light emitted from the laser light source 140 into parallel light which irradiates the phase-modulation spatial light modulator 120. The phase-modulation spatial light modulator 120 phase-modulates the parallel light to deliver phase-modulated light.

The Fourier transform lens 160 Fourier-transforms the phase-modulated light into Fourier-transformed light and collects the Fourier-transformed light into the aperture 170. The projection lens 180 projects the light collected by the Fourier transform lens 160 as projected light 190 to the outside.

The phase-modulation spatial light modulator 120 may be implemented by a liquid crystal element which uses, for example, a ferroelectric liquid crystal, a homogenous liquid crystal, and a homeotropic liquid crystal. Specifically, the phase-modulation spatial light modulator 120 can be implemented by an LCOS (Liquid-Crystal on Silicon). The phase-modulation spatial light modulator 120 may be implemented by, for example, an MEMS (Micro Electro Mechanical System).

Specifically, in this example embodiment, the phase-modulation spatial light modulator 120 comprises a phase-modulation spatial light modulating element which is operable with at least two operation patterns. As will later be specifically described, the phase-modulation spatial light modulator 120 comprises, for example, a phase-modulation spatial light modulator which operates with two different operation patterns or two phase-modulation spatial light modulating elements each of which operates with a different operation pattern. In this even, the control unit 120 causes the phase-modulation spatial light modulator 120 to operate with two different operation patterns.

First Example Embodiment

Figure 3:
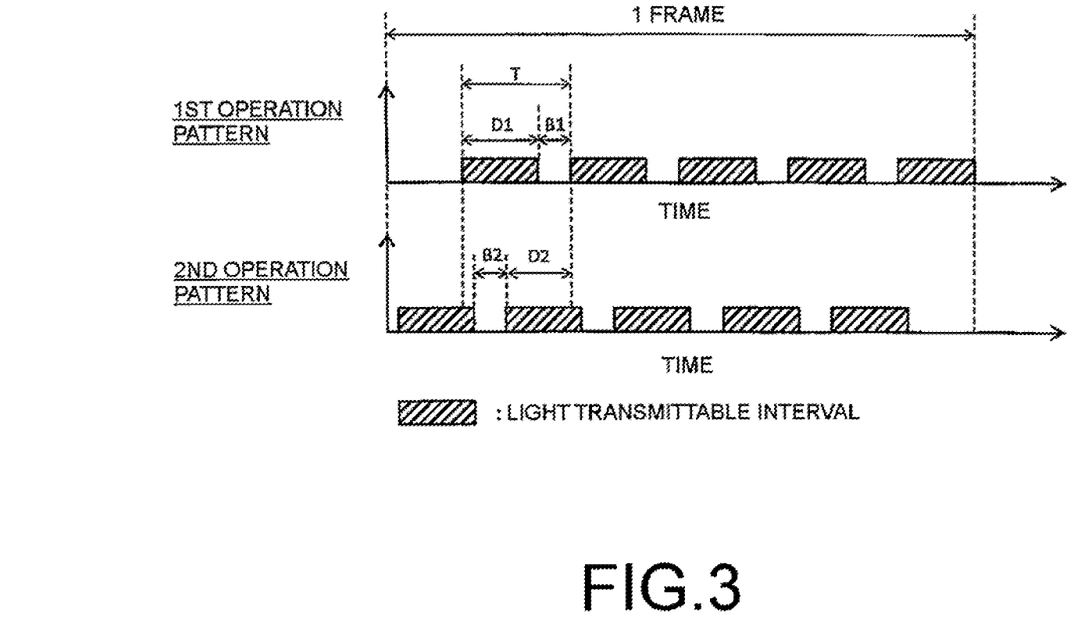
FIG. 3 is a view for illustrating operation patterns of a phase-modulation spatial light modulating element according to each example embodiment of the present invention.

Next referring to FIG. 3, description will proceed to an operation method of the phase-modulation spatial light modulator according to a first example embodiment. FIG. 3 is a schematic view for illustrating one example of operation patterns of the phase-modulation spatial light modulator 120. In FIG. 3, the axis of abscissas is a time and each area depicted by hatched lines is a time interval during which signal light can be transmitted. The operation patterns illustrated in FIG. 3 are illustrative and never limit an operation of the phase-modulation spatial light modulator 120.

As shown in FIG. 3, the control unit 110 can cause the phase-modulation spatial light modulator 120 to operate with a first operation pattern and with a second operation pattern. The first operation pattern and the second operation pattern have, during one frame time interval, a plurality of light transmissible intervals during which first signal light and second signal light can be transmitted, respectively. In the first operation pattern and the second operation pattern, an interval between a light transmissible interval and the next light transmissible interval is a pause interval during which the first signal light and the second signal light cannot be transmitted.

Herein, description will proceed to a relationship between the light transmissible interval and the pause interval in the first operation pattern and the second operation pattern in a predetermined period. As shown in FIG. 3, the first operation pattern has, during the predetermined period T, a first light transmittable interval D1 and a first pause interval B1. The second operation pattern has, during the period T, a second light transmittable interval D2 and a second pause interval B2.

Each of the first light transmittable interval D1 and the second light transmittable interval D2 is set to be longer than a half (T/2) of the period T. That is, D1>(T/2) and D2>(T/2). In addition, the first light transmittable interval D1 and the second light transmittable interval D2 are overlapped at least partially with each other.

The first pause interval B1 is present within the second light transmittable interval D2. The second pause interval B2 is present within the first light transmittable interval D1. Specifically, the first operation pattern is an operation pattern for transmitting first signal light at least while the second operation pattern presents the pause interval. In addition, the second operation pattern is an operation pattern for transmitting second signal light at least while the first operation pattern presents the pause interval. Thus, in this example embodiment, it is possible to always transmit the signal light (i.e., light obtained by combining the first signal light with the second signal light) without deactivating the phase-modulation spatial light modulator 120.

Figure 4:
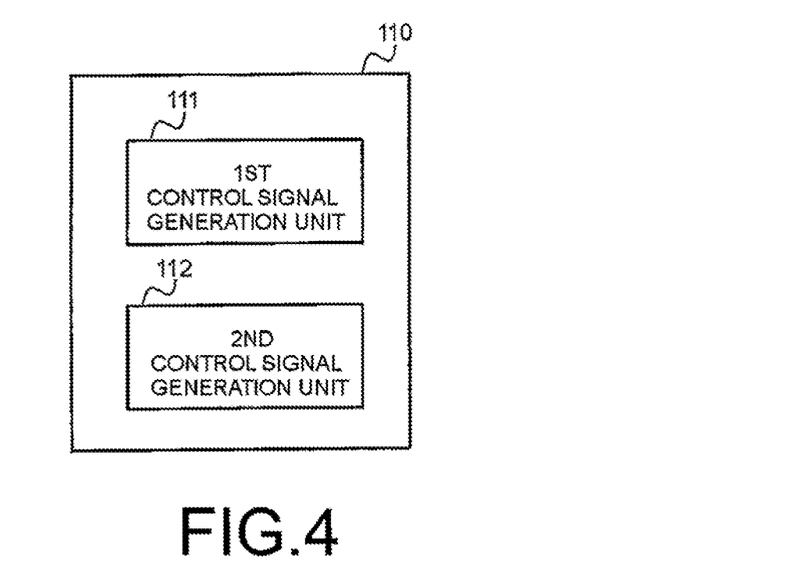
FIG. 4 is a block diagram for illustrating a configuration of a control unit according to a first example embodiment of the present invention.

FIG. 4 is a block diagram for illustrating an example of a configuration of the control unit 110 which causes the phase-modulation spatial light modulator 120 to operate with the first operation pattern and the second operation pattern. As shown in FIG. 4, the control unit 110 comprises a first control signal generation unit 111 and a second control signal generation unit 112.

The first control signal generation unit 111 generates a first control signal for causing the phase-modulation spatial light modulator 120 to operate with the first operation pattern. The second control signal generation unit 112 generates a second control signal for causing the phase-modulation spatial light modulator 120 to operate with the second operation pattern. The control unit 110 can cause the phase-modulation spatial light modulator 120 to operate with the first operation pattern and the second operation pattern by supplying the first control signal and the second control signal to the phase-modulation spatial light modulator 120. As a result, the control unit 110 can cause the phase-modulation spatial light modulator 120 to operate so as to always transmit the signal light without deactivating it.

Second Example Embodiment

Figure 5:
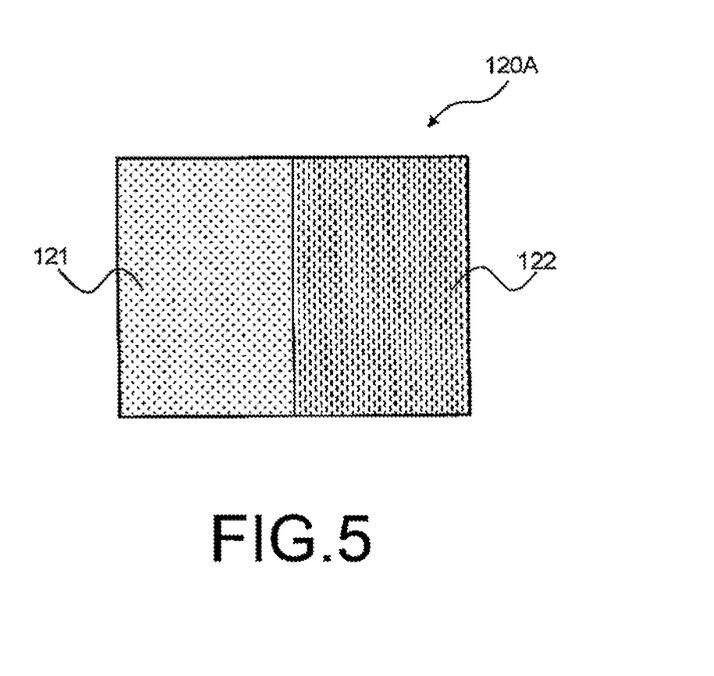
FIG. 5 is a diagram for illustrating a configuration of a phase-modulation spatial light modulator according to a second example embodiment of the present invention.

Next referring to FIGS. 3 and 5, description will proceed to an example of a phase-modulation spatial light modulator according to a second example embodiment of the present invention. As shown in FIG. 5, the phase-modulation spatial light modulator 120A comprises a first area 121 and a second area 122.

The first area 121 is an area for operating with the first operation pattern. The second area 122 is an area for operating with the second operation pattern. That is, the phase-modulation spatial light modulator 120A comprises two areas operable with the operation patterns which are different from each other. Specifically, the phase-modulation spatial light modulator 120A can be implemented by an LCOS comprising the two areas operable with the operation patterns which are different from each other.

Figure 6:
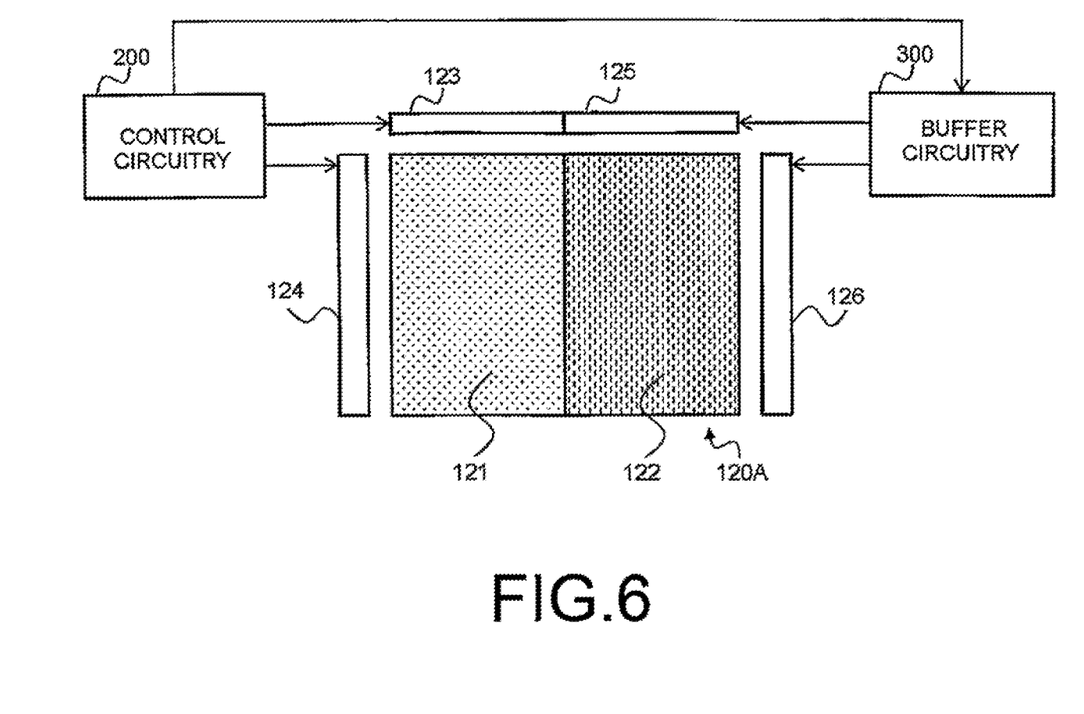
FIG. 6 is a schematic diagram for use in explaining a method of controlling an operation of the phase-modulation spatial light modulator according to the second example embodiment of the present invention.

FIG. 6 is a schematic diagram for use in explaining a method of controlling an operation of the phase-modulation spatial light modulator 120A. Now, referring to FIG. 6, description will proceed to the method of causing the phase-modulation spatial light modulator 120A to operate. The phase-modulation spatial light modulator 120A is connected with a control circuitry 200 and a buffer circuitry 300.

The control circuitry 200 has a function of delivering an image signal including image information to the phase-modulation spatial light modulator 120A and producing a scanning signal for causing the phase-modulation spatial light modulator 120A to successively acquire the image information.

Specifically, in the vicinity of the first area 121, a first reception circuitry 123 for receiving a first image signal and a first scanning circuitry 124 for receiving a first scanning signal are disposed. In this event, the control circuitry 200 delivers the first image signal to the first reception circuitry 123 in order to cause the first area 121 to display an image. In addition, the control circuitry 200 delivers the first scanning signal to the first scanning circuitry 124 in order to cause the first area 121 to successively acquire the image information of the image. As a result, the control circuitry 200 can cause the first area 121 to operate with the first operation pattern.

On the other hand, in the vicinity of the second area 122, a second reception circuitry 125 for receiving a second image signal and a second scanning circuitry 126 for receiving a second scanning signal are disposed. In addition, the second reception circuitry 125 and the second scanning circuitry 126 are connected to the buffer circuitry 300. In this event, on controlling the second area 122, the control circuitry 200 first delivers the first image signal and the first scanning signal to the buffer circuitry 300. Then, in order to cause the second area 122 to display an image, the buffer circuitry 300 delivers, to the second reception circuitry 125, the second image signal obtained by delaying the first image signal by a predetermined time interval. In addition, the buffer circuitry 300 delivers, to the second scanning circuitry 126, the second scanning signal obtained by delaying the first scanning signal by the predetermined time interval. As a result, the control circuitry 200 can cause the second area 122 to operate with the second operation pattern.

Third Example Embodiment

Figure 7:
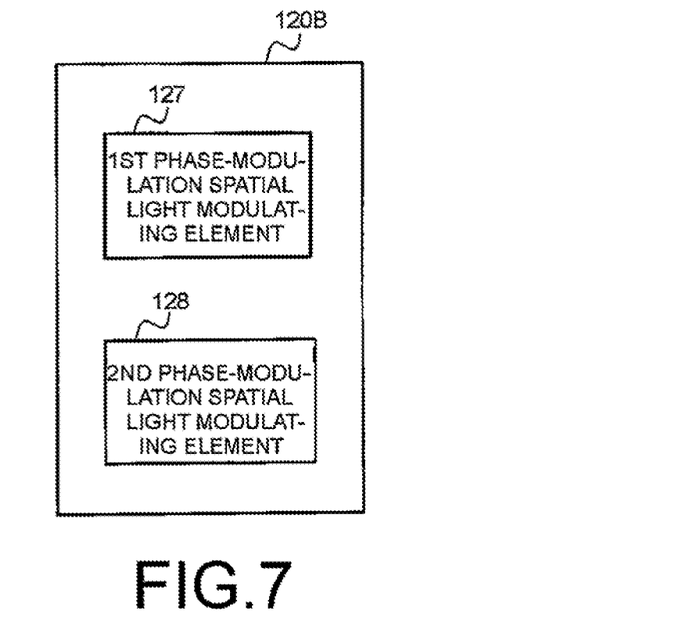
FIG. 7 is a diagram for illustrating a configuration of a phase-modulation spatial light modulator according to a third example embodiment of the present invention.

Next referring to FIGS. 3 and 7, description will proceed to an example of a phase-modulation spatial light modulator according to a third example embodiment of the present invention. As shown in FIG. 7, the phase-modulation spatial light modulator 120B includes a first phase-modulation spatial light modulating element 127 and a second phase-modulation spatial light modulating element 128.

The first phase-modulation spatial light modulating element 127 is a phase-modulation spatial light modulating element for operating with the first operation pattern. The second phase-modulation spatial light modulating element 128 is a phase-modulation spatial light modulating element for operating with the second operation pattern. That is, the phase-modulation spatial light modulator 120B includes two phase-modulation spatial light modulating elements operable with the operation patterns which are different from each other. Specifically, the phase-modulation spatial light modulator 120B is configured by arranging an LCOS operating with the first operation pattern and another LCOS operating with the second operation pattern so as to be in close proximity to each other. By arranging such a phase-modulation spatial light modulator 120B within an optical system which includes the laser light source 140, the collimator lens 150, the Fourier transform lens 160, the aperture 170, and the projection lens 180 as illustrated in FIG. 2, it is possible to implement the communication device which can always transmit the signal light.

Figure 8:
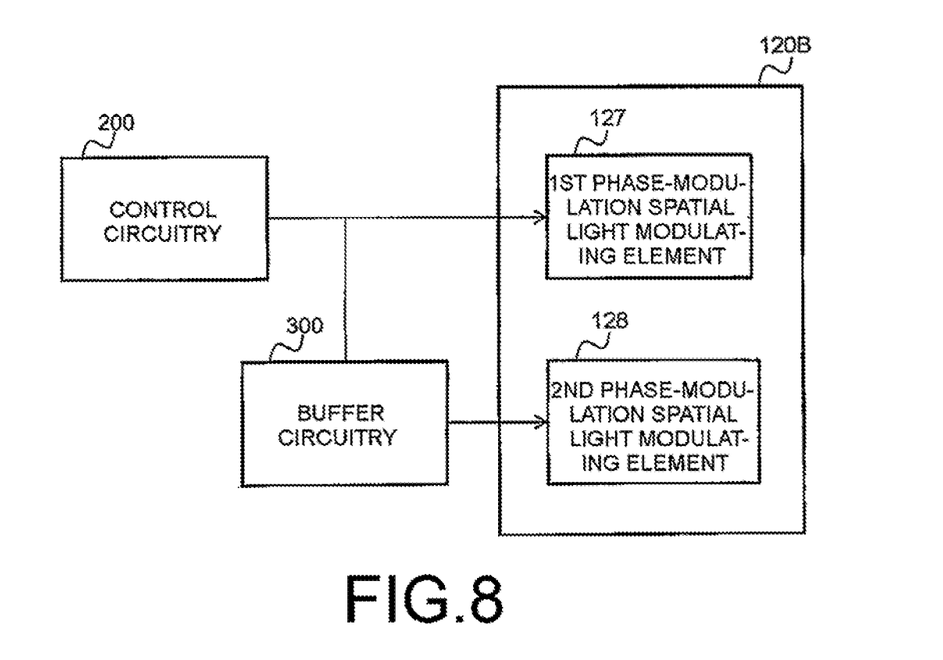
FIG. 8 is a schematic diagram for use in explaining a method of controlling an operation of the phase-modulation spatial light modulator according to the third example embodiment of the present invention.

FIG. 8 is a schematic diagram for use in explaining a method of controlling an operation of the phase-modulation spatial light modulator 120B. Now, referring to FIG. 8, description will proceed to the method of causing the phase-modulation spatial light modulator 120B to operate. The phase-modulation spatial light modulator 120B is connected with the control circuitry 200 and the buffer circuitry 300.

The control circuitry 300 has a function of delivering, to the phase-modulation spatial light modulator 120B, a control signal for displaying and scanning an image.

Specifically, the control circuitry 200 delivers, to the first phase-modulation spatial light modulating element 127, a first control signal for causing it to operate with the first operation pattern. As a result, the control circuitry 200 can cause the first phase-modulation spatial light modulating element 127 to operate with the first operation pattern.

In addition, the control circuitry 200 supplies the first control signal to the buffer circuitry 300. The buffer circuitry 300 delivers, to the second phase-modulation spatial light modulating element 128, a second control signal obtained by delaying the first control signal by the predetermined time interval. As a result, the control circuitry 200 can cause the second phase-modulation spatial light modulating element 128 to operate with the second operation pattern.

[Hardware Configuration]

The communication device according to the example embodiments of the present invention may be implemented by hardware or may be implemented by software. In addition, the receiving device may be implemented by a combination of hardware and software.

Figure 9:
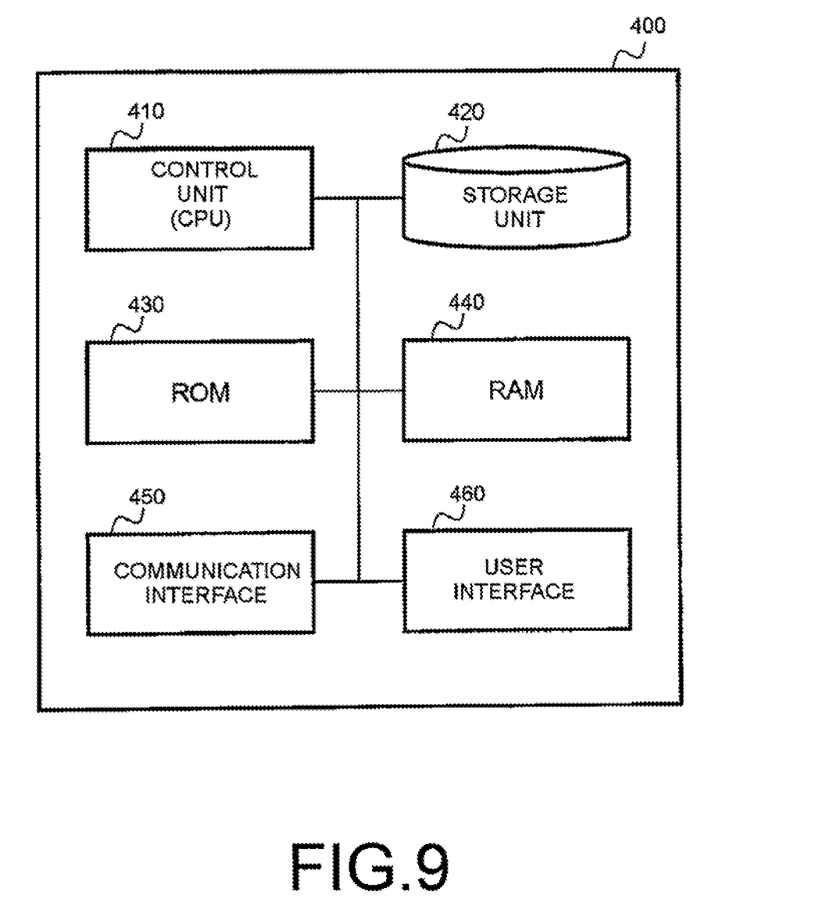
FIG. 9 is a block diagram for illustrating an example of hardware configuration of a communication device according to each example embodiment of the present invention.

FIG. 9 is a block diagram for illustrating one example of an information processing apparatus (computer) constituting the communication device.

As shown in FIG. 9, the information processing apparatus 400 comprises a control unit (CPU: Central Processing Unit) 410, a storage unit 420, an ROM (Read Only Memory) 430, an RAM (Random Access Memory) 440, a communication interface 450, and a user interface 460.

The control unit (CPU) 410 may implement various functions of the communication device by developing, in the RAM 440, a program held in the storage unit 420 or the ROM 430 and by executing the program. In addition, the control unit (CPU) 410 may comprise an internal buffer which is adapted to temporarily store data or the like.

The storage unit 420 comprises a large-capacity storage medium which can hold various types of data and may be implemented by a storage medium such as an HDD (Hard Disk Drive), an SSD (Solid State Drive), and so on. The storage unit 420 may be a cloud storage existing in a communication network when the information processing apparatus 400 is connected to the communication network via the communication interface 450. The storage unit 420 may hold the program readable by the control unit (CPU) 410.

The ROM 430 comprises a nonvolatile storage device which may be constituted by a flash memory having a small capacity as compared to the storage unit 420. The ROM 430 may hold a program which is readable by the control unit (CPU) 410. The program readable by the control unit (CPU) 410 may be held in at least one of the storage unit 420 and the ROM 430.

The program readable by the control unit (CPU) 410 may be supplied to the information processing apparatus 400 in a state where it is non-transitorily stored in various storage media readable by the computer. Such storage media may be, for example, a magnetic tape, a magnetic disk, a magneto-optical disc, a CD-ROM, a CD-R, a CD-R/W, and a semiconductor memory.

The RAM 440 comprises a semiconductor memory such as a DRAM (Dynamic Random Access Memory) and an SRAM (Static Random Access Memory) and may be used as an internal buffer which temporarily stores data and so on.

The communication interface 450 is an interface which connects the information processing apparatus 400 and the communication network via wire or wirelessly.

The user interface 460 comprises, for example, a displaying unit such as a display and an input unit such as a keyboard, a mouse, and a touch panel.

The whole or part of the above-mentioned example embodiments can be described as, but not limited to, the following supplementary notes.

[Supplementary Note 1]

A communication device at least comprising a phase-modulation spatial light modulator and a control unit configured to control an operation of the phase-modulation spatial light modulator, wherein the control unit is configured to cause, during one frame time interval, the phase-modulation spatial light modulator to operate with a first operation pattern and a second operation pattern, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, and wherein the second pause interval is present within the first light transmittable interval whereas the first pause interval is present within the second light transmittable interval.

[Supplementary Note 2]

The communication device according to Supplementary Note 1, wherein the phase-modulation spatial light modulator comprises a phase-modulation spatial light modulating element, wherein the phase-modulation spatial light modulating element comprises a first area configured to be operated with the first operation pattern and a second area configured to be operated with the second operation pattern.

[Supplementary Note 3]

The communication device according to Supplementary Note 1, wherein the phase-modulation spatial light modulator comprises a first phase-modulation spatial light modulating element configured to be operated with the first operation pattern and a second phase-modulation spatial light modulating element configured to be operated with the second operation pattern.

[Supplementary Note 4]

The communication device according to any one of Supplementary Notes 1 to 3, wherein the control unit comprises a first control signal generation unit configured to generate a first control signal for operating the phase-modulation spatial light modulator with the first operation pattern and a second control signal generation unit configured to generate a second control signal for operating the phase-modulation spatial light modulator with the second operation pattern.

[Supplementary Note 5]

A phase-modulation spatial light modulating element, comprising:

a first area configured to operate with a first operation pattern during one frame time interval and a second area configured to operate with a second operation pattern during one frame time interval, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, wherein the second pause interval is present within the first light transmittable interval whereas the first pause interval is present within the second light transmittable interval.

[Supplementary Note 6]

A method of controlling an operation of a phase-modulation spatial light modulator, comprising:

causing, during one frame time interval, the phase-modulation spatial light modulator to operate with a first operation pattern and a second operation pattern, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, wherein the second pause interval is present within the first light transmittable interval whereas the first pause interval is present within the second light transmittable interval.

[Supplementary Note 7]

The operation control method according to Supplementary Note 6, wherein the phase-modulation spatial light modulator comprises a phase-modulation spatial light modulating element, the phase-modulation spatial light modulating element having a first area and a second area, wherein the operation control method comprises:

causing the first area to operate with the first operation pattern, and causing the second area to operate with the second operation pattern.

[Supplementary Note 8]

The operation control method according to Supplementary Note 6, wherein the phase-modulation spatial light modulator comprises a first phase-modulation spatial light modulating element and a second phase-modulation spatial light modulating element, wherein the operation control method comprises:

causing the first phase-modulation spatial light modulating element to operate with the first operation pattern, and causing the second phase-modulation spatial light modulating element to operate with the second operation pattern.

[Supplementary Note 9]

The operation control method according to any one of Supplementary Notes 6 to 8, comprising:

generating a first control signal for operating the phase-modulation spatial light modulator with the first operation pattern; and generating a second control signal for operating the phase-modulation spatial light modulator with the second operation pattern.

[Supplementary Note 10]

An operation control program for making a computer control an operation of a phase-modulation spatial light modulator, the operation control program making the computer:

execute, during one frame time interval, processing for causing the phase-modulation spatial light modulator to operate with a first operation pattern and a second operation pattern, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, wherein the second pause interval is present within the first light transmittable interval whereas the first pause interval is present within the second light transmittable interval.

REFERENCE SIGNS LIST 100 communication device
110 control unit
120, 120A, 120B phase-modulation spatial light modulator
121 first area
122 second area
123 first reception circuitry
124 first scanning circuitry
125 second reception circuitry
126 second scanning circuitry
127 first phase-modulation spatial light modulating element
128 second phase-modulation spatial light modulating element
130 detector
140 laser light source
150 collimator lens
160 Fourier transform lens
170 aperture
180 projection lens
190 projected light
161 first control signal generation unit
162 second control signal generation unit
200 control circuitry
300 buffer circuitry
400 information processing apparatus
410 control unit (CPU: Central Processing unit)
420 storage device
430 ROM (Read Only Memory)
440 RAM (Random Access Memory)
450 communication interface
460 user interface

The invention claimed is:

1. A communication device configured to transmit signal light, the communication device at least comprising a phase-modulation spatial light modulator having a blanking time interval and a control unit configured to control an operation of the phase-modulation spatial light modulator, wherein the control unit is configured to cause, during one frame time interval, the phase-modulation spatial light modulator to operate with a first operation pattern and a second operation pattern, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, and wherein the second pause interval is present within the first light transmittable interval whereas the first pause interval is present within the second light transmittable interval whereby the communication device can always transmit the signal light obtained by combining the first signal light with the second signal light without deactivating the phase-modulation spatial light modulator.

2. The communication device as claimed in claim 1, wherein the phase-modulation spatial light modulator comprises a phase-modulation spatial light modulating element, wherein the phase-modulation spatial light modulating element comprises a first area configured to be operated with the first operation pattern and a second area configured to be operated with the second operation pattern.

3. The communication device as claimed in claim 1, wherein the phase-modulation spatial light modulator comprises a first phase-modulation spatial light modulating element configured to be operated with the first operation pattern and a second phase-modulation spatial light modulating element configured to be operated with the second operation pattern.

4. The communication device as claimed in claim 1, wherein the control unit comprises a first control signal generation unit configured to generate a first control signal for operating the phase-modulation spatial light modulator with the first operation pattern and a second control signal generation unit configured to generate a second control signal for operating the phase-modulation spatial light modulator with the second operation pattern.

5. A phase-modulation spatial light modulating element for use in a communication device configured to transmit signal light, the phase-modulation spatial light modulating element having a blanking time interval, the phase-modulation spatial light modulating element comprising:

a first area configured to operate with a first operation pattern during one frame time interval and a second area configured to operate with a second operation pattern during one frame time interval, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, wherein the second pause interval is present within the first light transmittable interval whereas the first pause interval is present within the second light transmittable interval whereby the communication device can always transmit the signal light obtained by combining the first signal light with the second signal light without deactivating the phase-modulation spatial light modulating element.

6. A method of controlling an operation of a phase-modulation spatial light modulator for use in a communication device configured to transmit signal light, the phase-modulation spatial light modulator having a blanking time interval, the operation control method comprising:

causing, during one frame time interval, the phase-modulation spatial light modulator to operate with a first operation pattern and a second operation pattern, wherein the first operation pattern includes, in a predetermined period within the one frame time interval, a first light transmittable interval during which first signal light can be produced, and a first pause interval during which the first signal light cannot be produced, wherein the second operation pattern includes, in the predetermined period, a second light transmittable interval during which second signal light can be produced, and a second pause interval during which the second signal light cannot be produced, wherein each of the first light transmittable interval and the second light transmittable interval is longer than a half of the predetermined period, wherein the second pause interval is present within the first light transmittable interval whereas the first pause interval is present within the second light transmittable interval whereby the communication device can always transmit the signal light obtained by combining the first signal light with the second signal light without deactivating the phase-modulation spatial light modulator.

7. The operation control method as claimed in claim 6, wherein the phase-modulation spatial light modulator comprises a phase-modulation spatial light modulating element, the phase-modulation spatial light modulating element having a first area and a second area, wherein the operation control method comprises:

causing the first area to operate with the first operation pattern, and causing the second area to operate with the second operation pattern.

8. The operation control method as claimed in claim 6, wherein the phase-modulation spatial light modulator comprises a first phase-modulation spatial light modulating element and a second phase-modulation spatial light modulating element, wherein the operation control method comprises:

causing the first phase-modulation spatial light modulating element to operate with the first operation pattern, and causing the second phase-modulation spatial light modulating element to operate with the second operation pattern.

9. The operation control method as claimed in claim 6, comprising:

generating a first control signal for operating the phase-modulation spatial light modulator with the first operation pattern; and generating a second control signal for operating the phase-modulation spatial light modulator with the second operation pattern.

* * * * *